United States Patent Office 3,075,463
Patented Jan. 29, 1963

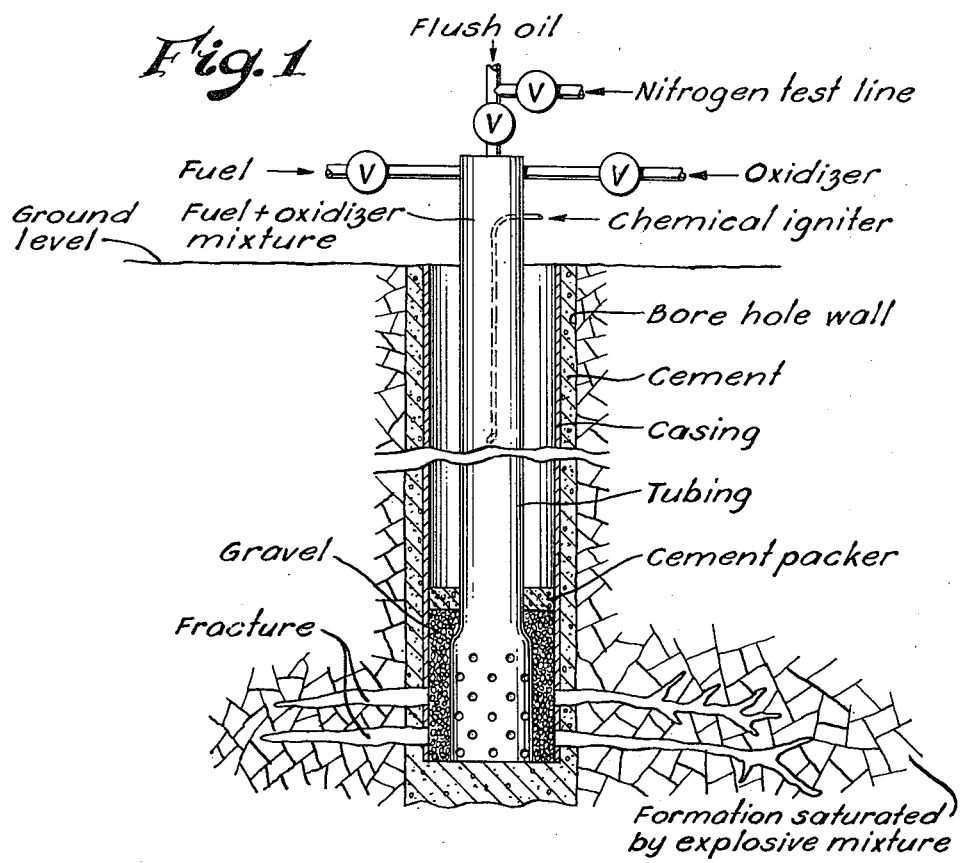
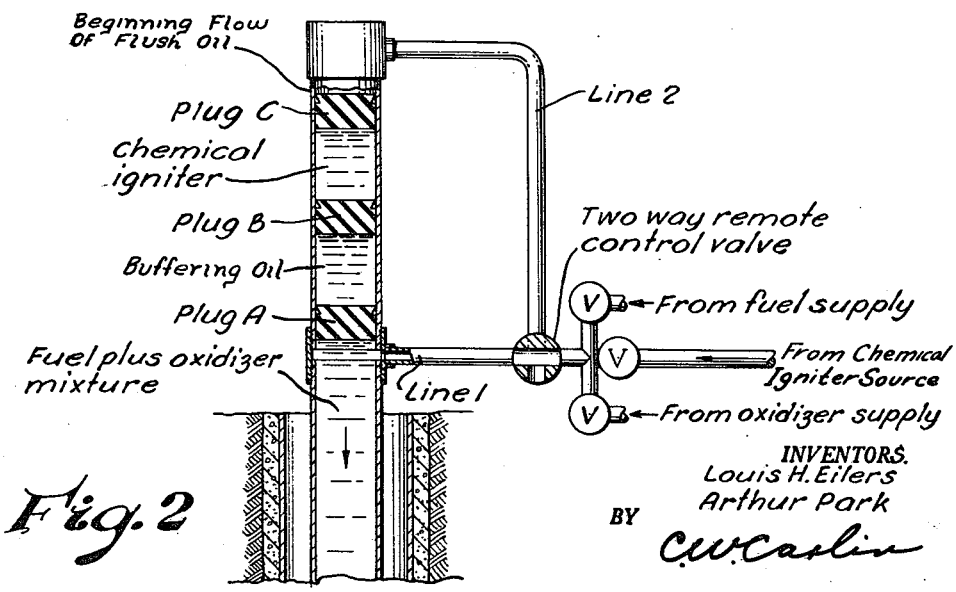

3,075,463
WELL FRACTURING
Louis H. Eilers and Arthur Park, Tulsa, Okla., assignors to The Dow Chemical Company, Midland, Mich., a corporation of Delaware
Filed Sept. 4, 1959, Ser. No. 838,051
4 Claims. (Cl. 102—21)

The invention is in the field of well treatment and is directed particularly to the use of an explosive mixture in a fluid-bearing formation traversed by a well for the purpose of increasing the fluid flow therefrom.

The obtainment of fluids from a fluid-bearing formation is dependent upon a number of conditions existing in the formation among which is the character of the confining strata or reservoir rock in the formation which contain the fluid, particularly the porosity and permeability thereof.

Fluids contained in a subsurface formation are usually confined between substantially impermeable rock strata. The impermeable strata commonly exist as folds often classed according to structure, complexity, and depth as either dome-folds or basin-folds. The impermeable upper stratum, referred to as cap rock, is often shale which is thought, prior to being compacted, to have constituted a source bed for the fluid, e.g., petroleum, during its formation and accumulation.

The fluid-bearing portions of the formation or reservoir rock are porous to some extent. The extent and character of the pores in rock determine the porosity, i.e., the percent volume of the total pore space of a given volume of rock. The volume percent of total pore space of the rock volume, however, is only one factor to be considered in obtaining fluids therefrom. Another factor which must be considered is the extent to which communication exists between the pores. The extent to which communication does exist between the pores determines the difficulty or ease with which fluids may pass through the rock and is referred to as permeability.

To procure a fluid, therfore, from a subsurface formation, the impermeable rock must be penetrated by a well to gain access to the fluid. Although some pressure usually exists in the fluid-bearing strata which tends to force the fluid from the fluid-bearing formation toward such well, and sometimes up the well after the cap rock has been penetrated, additional pressure usually must be provided even at the outset and almost invariably within a very short time after fluid has been flowing from the formation. Pressures are usually supplied by pumps or fluid displacement, e.g., gas and/or water injection.

However, despite the utilization of high pressures in fluid-bearing formations, the permeability of such formations is often of such nature that the fluid therein cannot be forced out and, consequently, unless other means are provided than mere penetration and the application of pressure, a substantial portion, often running over half the total oil present in a reservoir rock, remains therein.

Various methods of stimulating the flow from wells penetrating fluid-bearing formations, which have fallen to low levels of production despite large reserves of fluid yet remaining therein, have been attempted. Among the most successful of such methods are acidizing and hydraulic fracturing of the formation.

Acidizing consists essentially of injecting an aqueous solution of an acid, usually hydrochloric, often containing an inhibitor to metal attack, into a well requiring treatment. Acidizing is generally limited to wells penetrating calcium carbonate-containing formations. The acid reacts with the calcium carbonate and causes cavities and channels to be created in the formation. Hydraulic fracturing refers generally to injecting a liquid, often a thickened oil or an oil-water emulsion, and preferably containing suspended particulated solids as a propping agent, e.g., sand, into a formation at high pressure to effect fracturing of the formation and thereby increase the permeability thereof. Acidizing and hydraulic fracturing may be combined by employing an acidic fracturing fluid.

Both acidizing and hydraulic fracturing have limitations inherent in such methods. Among such limitations are the lack of suitable cavities or fractures, or the creation thereof, in a formation to provide space for the initial injection of the fracturing fluids from which the fractures extend into the adjacent and surrounding formation to render it permeable to the passage therethrough of the fluid sought to be produced.

Attempts have been made to overcome some of the problems associated with decreased productivity from fluid-bearing formations by "shooting" the well with an explosive such as nitroglycerine. These explosives, however, have been difficult to control and are essentially confined to the well-bore, a consequence of which is that detonation has little effect upon the formation which is not immediately adjacent to the borehole. Furthermore, the use of high explosives such as nitroglycerine in the production of fluids such as oil and gas have inherent dangers associated therewith that are to be avoided if possible.

Fracturing by injecting nitromethane, previously sensitized with an amine, down a well and detonating the thus injected sensitized nitromethane by means of a shock initiated high velocity detonator, e.g., a blasting cap or Primacord (pentaerythritoltetranitrate), is also known. The use of nitromethane in this manner requires a mechanical device for setting off the explosive thereby necessitating extentions of fuse or cord and a means for providing heat or impulse to the explosive. Furthermore, nitromethane alone, even though unsensitized, has been known to explode violently without satisfactory explanation therefor.

A desideratum exists in the art of producing fluids from a subsurface formation by means of a well traversing the formation for a more effective, convenient, and safer method of improving the passage of fluids from both the formation or portions thereof which bear the fluids and through the formation or portions thereof which lie between the fluid-bearing formations and the well.

The primary object of the invention is to satisfy the requirements of this existing desideratum. The manner by which this object and related objects is attained will be made clear in the ensuing description and is defined in the appended claims.

The invention is a method of treating a well traversing a subterranean formation consisting essentially of injecting down the well, and into the adjacent porous portions of the formation and channels extending from the wellbore into the formation so traversed, a mixture of two liquid reactants, one of which is an oxidizing agent, e.g., fuming nitric acid, and the other a reducing agent, e.g., 2-nitropropane, hereinafter usually referred to as a fuel, the reactants in the mixture being reactive explosively when subsequently detonated, detonating the mixture either by a shock or spark type igniter or by injecting into the well and into contact with at least a portion of the mixture a liquid igniter which chemically ignites or detonates the mixture of reducing and oxidizing agents previously injected into the well. The addition of the liquid igniter to the mixture of oxidizing and reducing agents renders the mixture thus formed hypergolic. The resulting explosion propagates through the remaining mixture of oxidizing and reducing agents in the well producing fractures such as cavities, passageways, channels, fissures, and the like. Production of wells so treated is greatly increased due to improved permeability of the formation.

Although the shock or spark type igniter, e.g., a time fuse and blasting cap, an electrically heated filament, or a cord composed of an explosive composition leading into the well from a point at which an impulse or impact is applied is satisfactory for setting off the oxidizing-reducing agent mixture in the practice of the invention, the liquid chemical igniter is definitely more convenient and more readily adaptable to general use in well treatments.

In the annexed drawing there are schematically illustrated convenient modes of practicing the invention whereby the explosive mixture is maintained out of contact with the chemical igniter or detonator until detonation in the formation is desired.

FIGURE 1 represents a well during treatment comprising a wellbore; a casing, having suitable perforations in the lower portion thereof, cemented in position in the wellbore; tubing, having a perforated lower portion positioned opposite the perforations in the casing, inserted down the casing for admitting fuel and oxidizer to the formation; a suitably located flush-oil line and nitrogen gas-test line; a chemical igniter line extending a distance down the well; gravel packing near the annulus between the perforated portions of the casing and tubing; a cement packer above the gravel; and fractures, produced in accordance with the invention, extending outwardly from the wellbore into the formation.

FIGURE 2 represents a convenient arrangement for injecting the liquid fuel, oxidizer, flush-oil, and chemical igniter by employing rubber plugs A, B, and C, which provide means for keeping the fuel-oxidizer mixture separated from the chemical igniter by the flush-oil until a substantial portion of the fuel-oxidizer mixture has penetrated the formation. The practice of the invention employing the arrangement represented in FIGURE 2 is described in more detail hereinafter under Example 34.

If desired, the treatment of a well in accordance with the invention may be either preceded by or followed by conventional fracturing or a well already fractured may be treated according to the invention and then, if desired, again fractured by hydraulic fracturing. It has been found that conventional fracturing has enhanced the beneficial effects produced by the practice of the invention.

The reducing agents employed in the practice of the invention, as aforesaid, may be referred to as liquid fuels. Any fuel which does not react with fuming nitric acid upon the admixture therewith of the acid, but which does so react when subsequently admixed with a chemical igniter agent as above described is satisfactory. Among the reducing agents suitable for the practice of the invention are liquid hydrocarbons, liquid derivatives of hydrocarbons, and liquid dispersions of finely divided solid hydrocarbons. Specific examples of such liquid fuels are nitroalkanes, aliphatic alcohols, ethers, and esters, and solid hydrocarbons dissolved or dispersed in liquid hydrocarbons, e.g., bitumen, tars, or asphalt dissolved in liquid petroleum fractions. Low molecular weight aliphatic and aromatic hydrocarbons containing a nitro group are the reducing agents usually used.

Among the oxidizing agents useful in the practice of the invention are liquid halogens, hydrogen peroxide, perchloric acid, nitric acid, and fuming nitric acid. Nitric or fuming nitric acid may have admixed therewith concentrated sulfuric or fuming sulfuric acid. The preferred oxidizing agent to employ is fuming nitric acid, particularly red fuming nitric acid. Red fuming nitric acid consists of an aqueous solution of $HNO_3$ having dissolved therein $NO_2$. Red fuming nitric acid may be prepared by passing $NO_2$ into nitric acid, preferably concentrated nitric acid, or by reacting an alkali metal nitrate, e.g., $KNO_3$, with fuming $H_2SO_4$. A discussion of fuming nitric acids and their preparation may be found in Mellor's A Comprehensive Treatise of Inorganic and Theoretical Chemistry, volume VIII, page 563 et seq. Concentrated nitric acid is usually considered to be 67 or 68 percent $HNO_3$ dissolved in water since that percentage has a stable boiling point. Up to 42 percent $NO_2$ can be dissolved in such concentrated nitric acid but only about 14 or 15 percent by weight of $NO_2$ based on the weight of the nitric acid is considered a maximum for practical purposes. Nitric acid having a concentration appreciably greater than 68 percent, e.g., 85 to 100 percent $HNO_3$ is known as white fuming nitric acid. Traces or very small percents of $NO_2$ and/or water usually exist in white fuming nitric acid. Mixtures consisting of white fuming nitric and fuming sulfuric acid, the latter usually containing about 20 percent $SO_3$ dissolved in concentrated $H_2SO_4$, are commonly employed as a liquid oxidizing agent.

Illustrative of the chemical detonator or igniter to employ in the practice of the invention are especially powerful oxidizing or reducing agents. The latter are more commonly employed among which are aniline, alkyl-substituted aniline, furfuryl alcohol, dichloropropene, monochloropropane, ethylene diamine, butyl amine, diethylene triamine, and solutions of such oxygen-containing compounds as sodium and potassium chlorates and perchlorates, potassium permanganate, and potassium dichromate in nitric acid, preferably concentrated nitric acid.

To show the effects of admixing a fuel and an oxidizing agent and thereafter igniting the mixture chemically by the addition of a liquid detonator or igniter, Examples 1 to 26 were run according to the following procedure: 10 parts by volume of each of the fuels listed in Table I below were placed in a suitable bomb. To this quantity were admixed about 24 parts by volume of red fuming nitric acid as the oxidizing agent which consisted of 98–99.5 percent $HNO_3$ (balance water) having dissolved therein about 14 percent, by weight of the $HNO_3$, of $NO_2$. Example 27 was run similarly to Examples 1 to 26 but, instead of red fuming nitric acid, there was employed 24 parts by volume of white fuming nitric acid consisting of 97.5 percent or more $HNO_3$, up to 0.5 percent $NO_2$, and balance water. The resulting mixture in each example was detonated by admixing therewith 1 part by volume of furfuryl alcohol.

TABLE I

Oxidizing agent: 24 parts by volume of red fuming nitric acid (except Example 27 for which see footnote).
Fuel: 10 parts by volume of the fuel named.
Detonator: 1 part furfuryl alcohol.

| Example No.: | Fuel used |
| --- | --- |
| 1 | 2-nitropropane. |
| 2 | 1-nitropropane. |
| 3 | Nitromethane. |
| 4 | Nitroethane. |
| 5 | Nitrobenzene. |
| 6 | o-Nitrotoluene. |
| 7 | 2-nitrotoluene. |
| 8 | Methyl alcohol. |
| 9 | Ethyl alcohol. |
| 10 | n-Propyl alcohol. |
| 11 | n-Butyl alcohol. |
| 12 | Diethyl ether. |
| 13 | Dioxane. |
| 14 | Methyl acetate. |
| 15 | Ethyl acetate. |
| 16 | Propyl formate. |
| 17 | Propyl acetate. |
| 18 | Amyl acetate. |
| 19 | Ethyl laurate. |
| 20 | Ethyl oxylate. |
| 21 | Methyl triglycol acetate. |
| 22 | Ethyl acrylate. |
| 23 | Ethyl phthalate. |
| 24 | Liquid coal tar. |
| 25 | No. 15–18 grade coal tar bases.[1] |
| 26 | Ethylene dichloride. |
| 27 [2] | 2-nitropropane. |

[1] This is a coal tar fraction of the pyridine type, boiling between 150–180° C.
[2] 24 parts by volume white fuming nitric acid used.

Each of the fuels (reducing agents) shown above reacted explosively with the fuming nitric acid when employed as above described upon admixing the furfuryl alcohol therewith and are suitable for the practice of the invention.

*Example 28*

Further tests were run to show the effectiveness of various chemical energy sources for detonating the fuel and oxidizing agent mixture. The procedure employed in running the tests was as follows: A mixture of 10 parts by volume of 2-nitropropane and 24 parts by volume of the red fuming nitric acid employed in Examples 1 to 26 was prepared. 1 part by volume of each of the following chemicals was added to the 2-nitropropane and fuming nitric acid mixture: furfuryl alcohol, aniline, mixtures of furfuryl alcohol and aniline, ethylene diamine, butyl amine, diethylene triamine, methyl aniline, dichloropropene, monochloropropane, and 1 part by volume of about 50 percent solutions of potassium chlorate, potassium permanganate, potassium dichromate, sodium chlorate, and sodium perchlorate dissolved in concentrated nitric acid. Each of these detonators caused the mixtrue of fuel and oxidizing agent to explode satisfactorily for use in the practice of the invention.

It has been found that at a pressure of 6000 p.s.i. and a temperature of 400° F., no explosion of the mixture occurred without the use of a chemical or mechanical igniter but at a pressure of 6000 p.s.i. and a temperature of 450° F., the mixture exploded without the use of an igniter. In practicing the invention, at least enough oxidizer should be supplied to react completely with the combustible fuel present. For example, a mixture of 58 parts of red fuming nitric (14 percent $NO_2$ in concentrated aqueous $HNO_3$, as described hereinbefore) and 42 parts of 2-nitropropane constitute reacting weights of these ingredients. It is suggested, however, in the practice of the invention that there be present an excess of the oxidizer. This recommendation is based at least in part upon the likelihood of other fuel materials being present in the well in the form of oil or gas.

*Example 29*

Additional tests were run to show the effect of varying the proportions of oxidizing agent and reducing agent employed. The tests consisted of a series of runs wherein the volume ratio (measured at room temperature) of the red fuming nitric acid described above, to 2-nitropropane was changed by decrements of 5 parts by volume of the fuming nitric acid and corresponding increments of 5 parts of the 2-nitropropane from a ratio of 80:20 to one of 30:70, respectively. It was found that a mixture of 80 parts of the fuming nitric acid and 20 parts of the 2-nitropropane did not result in an explosion when a No. 8 blasting cap was set off in contact therewith but that a ratio of 75 parts of the fuming nitric acid and 25 parts of the 2-nitropropane did result in an explosion when detonated according to the invention. As the volume ratio was changed, as above stated, all resulting mixtures thereof exploded when detonated until the volume ratio reached 30 of the nitric to 70 of the 2-nitropropane when a resulting explosion became uncertain, such mixture exploding about one out of each three attempts. When the percent of fuming nitric acid was then slightly increased to a ratio of 33 parts thereof to 67 parts of the 2-nitropropane, introduction of an igniter resulted in an explosion with each attempt.

*Example 30*

Another series of tests run employing nitromethane instead of 2-nitropropane. One test was run without the presence of an oxidizing agent. The other tests of the series were then run employing increasing parts by volume of the red fuming nitric acid described above admixed with nitromethane. It was found that nitromethane alone could not be detonated by the addition thereto of the most effective igniter liquids employed such as aniline, furfuryl, and mixtures thereof nor with a No. 8 fulminate of mercury type blasting cap. It was found necessary to employ at least 5 parts of red fuming nitric acid and 95 parts by volume of the nitromethane before the mixture could be detonated either by a No. 8 fulminate type blasting cap or by chemical means. Thereafter in each of the succeeding tests of the series, the ratio of red fuming nitric acid was increased 5 parts by volume and the nitromethane decreased a corresponding 5 parts by volume. The mixtures thus made were satisfactorily detonated by a No. 8 blasting cap until the volume ratio of 70 parts by volume of fuming red nitric acid and 30 parts by volume of nitromethane was tried when no explosion occurred upon subsequent detonation. Detonation was, therefore, shown to be satisfactory for volume ratios of from 5 to 65 parts of red fuming nitric acid and from 95 to 5 parts of nitromethane.

*Examples 31 and 32*

Additional tests, designated Examples 31 and 32, were made to show the extent of penetration of an explosive mixture prepared as above into earthen material of the nature of oil-bearing sands, and the propagation of the explosion through such sands. To simulate the conditions existing in subterranean formations, two 12-inch long open-end steel tubing sections, having a diameter of 0.2 inch, were packed with sand of a size of less than 325 mesh. Each tubing section was provided with a fluid-permeable sand retainer at each end.

Example 31 consisted of taking one of the thus sand-packed tubing sections and securely clamping it in a vertical position to a support. The upper end of the tubing section was provided with an electrically operated indicator to show when the sand was wetted completely to the top. The upper end of the tubing section was then tightly engaged through a downwardly extending fluid-tight pipe to a 1200 ml. capacity expansion chamber positioned thereabove to accommodate rapidly expanding gases such as those resulting from an explosion in the tubular section below. The top of the expansion chamber contained three openings into one of which was inserted a pressure gauge, to a second of which was engaged an inlet line having a controlled flow for the introduction of a gas, e.g., $N_2$ to flush out the system or provide added pressure for injection of liquid into the sand, and to the third of which was engaged a nipple, having a flow control means therein, for the purpose of either venting the changer, closing off such vent or for admission therethrough of the liquid detonator or igniter from a supply container thereof under pressure to set off the explosive mixture introduced as described immediately below. To the lower end of the tubular section containing the sand was connected a pipe leading from a container serving as a source of a liquid explosive mixture of oxidizing and reducing agents useful in the practice of the invention.

A liquid mixture of oxidizing and reducing agents, consisting, by volume, of 33 parts of 2-nitropropane and 67 parts of the red fuming nitric acid described hereinbefore was placed in the container connected to the bottom of the tubular section. An igniter liquid consisting of 75 percent by weight of furfuryl alcohol and 25 percent aniline was placed in the supply container therefor.

Pressure was then applied to the source of liquid explosive mixture which was thereby forced upwardly to the top of the sand column thus provided in the tubular section until the electrical indicator at the top of the sand column showed that the entire column was wet. The expansion chamber was then purged of air by admitting nitrogen gas thereinto through the inlet line provided at the top and venting it through another opening therein which was provided for venting the expansion chamber as described above. The nitrogen gas inlet was then closed.

The $N_2$ gas vent was then connected to the source of detonating or igniter liquid and a drop thereof was introduced through the opening (which had served as the vent) onto the sand. Detonation occurred upon contact of the detonating liquid mixture with the explosive mixture of oxidizer and reducer already in the sand. The explosion propagated downwardly through the sand accompanied by violent action and heat, blowing approximately the upper two-thirds of the sand contained in the tubular section upwardly into the expansion chamber and melting the lower one-third of the sand into a fused mass. The pressure during the explosion rose 500 p.s.i. It was estimated that a temperature of at least 2600° F. had been reached to fuse the sand.

Example 32 was then run which consisted of repeating Example 31 except that the explosive mixture was made up, by volume, of 33 parts of 2-nitropropane and 67 parts of the fuming white nitric acid described hereinbefore. The steps were otherwise substantially the same as those of Example 31. The pressure rose 400 p.s.i. during the explosion following introduction of a drop of the furfuryl alcohol-aniline mixture. The violence of the reaction and temperature rise as manifested by blowing the upper portion of the sand into the expansion chamber and fusing the balance were generally the same as when red fuming acid was employed in Example 31.

The results of Examples 31 and 32 show that the fluids comprising the reaction mixture permeate or impregnate sands and that highly effective explosions occur in said of the nature found in oil-producing formations when the mixture thus injected is chemically detonated.

The following examples are illustrative of treating a subterranean formation according to the invention.

*Example 33*

A 4-inch diameter experimental borehole was drilled into a soft sandstone formation having a porosity of 25 percent and a permeability of 140 millidarcies. The depth of the well was 35 feet. A 2-inch casing was positioned therein and cemented at the bottom to the borehole. The annulus between the casing and the borehole was then filled from the bottom to the top with cement. Both the casing and cement were then perforated to a distance of about 3 feet upwardly from the bottom of the well. A ½ inch carbon steel tubing, having affixed at the lower end thereof a 1 foot long section of ¾ inch diameter pipe which was perforated with sixteen ⅛ inch holes, was run into the hole so that the ¾ inch perforated pipe was positioned opposite the perforations in the casing. The annulus between the tubing and the casing was then packed from the bottom thereof up to a level of 1 foot above the top of the ¾ inch perforated pipe section with 4 to 40 mesh sand. The annulus between the tubing and the casing, extending above the bottom portion which had thus been filled with sand, was cemented to the top of the ground. Permeability of the formation at the location of the perforations in the ¾ inch pipe were tested by pumping nitrogen gas down the tubing. 4 p.s.i. were required to force nitrogen gas into the formation at a rate of 78 liters per hour.

A number 8 blasting cap, having an electric line attached thereto extending to an electrical ignition means on the top of the group, was run onto the bottom of the well. Thereafter 2 gallons of a mixture composed, by volume, of 40 parts of 2-nitropropane and 60 parts of red fuming nitric acid (14 percent $NO_2$ dissolved in 98 percent concentrated nitric acid of the type employed in the above examples) was pumped down the tubing. Examination of the formation adjacent to the perforated casing showed that the mixture had penetrated to between 7 and 8 inches. The blasting cap was then set off by means of an electrical igniter which exploded the 2-nitropropane and fuming nitric acid mixture.

Nitrogen gas was then again pumped into the well and found to enter freely, only 1 p.s.i. being required to produce a flow of 78 liters per hour in contrast to the pressure of 4 p.s.i. required to inject the nitrogen gas at the same rate prior to treatment. It is thereby seen that the permeability of the formation was appreciably increased by the practice of the invention. There was no damage at the well head as a result of the explosion.

*Example 34*

A second well consisting of a similar 4-inch borehole drilled into a sandstone formation to a depth of 35 feet was thereafter cased, and the casing cemented and the cement and casing, perforated as in Example 33. A ½ inch diameter tubing, having a ¾ inch diameter perforated pipe 1 foot long at the lower end thereof, was run into the well and the annulus thus formed between the tubing and the casing was then filled with a 4 to 40 mesh sand from the bottom thereof to a distance of about 1 foot above the top of the ¾ inch perforated pipe section similarly as in Example 33.

A 4-inch thick cement packer was positioned between the casing and the tubing above the perforated ¾ inch pipe (as represented by the cement packer shown in FIGURE 1), instead of filling the annulus therebetween completely with cement as in Example 33 above. To test the permeability of the formation at the perforations, nitrogen gas was pumped down the well and found to require 4 p.s.i. to force 20 liters thereof per hour into the formation. An explosive mixture composed of 0.6 gallon of 2-nitropropane and 0.9 gallon of red fuming nitric acid employed in the above example was pumped into the well. The arrangement for injecting the fuel, oxidizer, flush-oil, and chemical igniter in this example was of the type shown in FIGURE 2. When the explosive mixture prepared as described was in the well a rubber plug (represented by plug A of FIGURE 2) was placed above the level of the explosive mixture and 150 milliliters of 2-nitropropane, employed as a buffering liquid, were then run into the well on top of this rubber plug. A second rubber plug (represented by plug B of FIGURE 2) was then placed just above the level of the 2-nitropropane buffering liquid. Thereafter 150 milliliters of an igniter consisting of a mixture of 112.5 milliliters of furfuryl alcohol and 37.5 milliliters of aniline, to serve as the detonating liquid, were run into the well above this plug and a third rubber plug represented by plug C of FIGURE 2 placed above the igniter composition. Thereafter, 0.5 gallon of additional 2-nitropropane, to serve as a flush, was pumped down the well on top of the uppermost of the rubber plugs. Pressure was then applied to the flush liquid which forced all the rubber plugs downwardly out of position and caused the detonating liquid to follow the buffering liquid and, it in turn by the flush, downwardly, resulting in the igniter liquid coming in contact with the explosive mixture at the bottom of the well which resulted in an explosion in accordance with the practice of the invention.

After the treatment, nitrogen gas was forced into the well and it was found that 20 liters of nitrogen per hour were forced into the formation at a pressure of 1 p.s.i. in contrast to the 4 p.s.i. required to force the same amount of nitrogen per hour into the formation prior to treatment. The lessened pressure required to force nitrogen gas at the same rate into the formation following treatment definitely shows that the formation was rendered more permeable by the practice of the invention.

A number of advantages are to be realized by the practice of the invention among which are: the reactants employed in the invention do not result in any blocking or plugging of the pores as is often the case in conventional fracturing operations; individual components of the explosive mixture may be conveniently placed together above ground producing a relatively safe explosive mixture for the treatment of a subterranean formation; relatively elaborate pumping equipment capable of forcing liquids into a formation at the high rate of flow now required for conventional fracturing is not necessary since only relatively low pumping rates are employed for placing the reactants in the well according to the invention; undesirable accompanying effects such as water blocks which often occur when employing an aqueous fracturing liquid in an oil-bearing formation are clearly unlikely in the practice of the invention; the materials employed in the practice of the invention are substantially all converted to gases during treatment and leave no foreign harmful residue or reaction products in the formation; the liquid explosive mixture employed in the invention penetrates the porous formation and the ensuing explosion propagates into the formation from the point of initiation of the explsion by mere contact of any portion thereof with the igniter liquid; the individual components of the explosive mixture, with the exception of nitromethane which need not be employed, have been found to be impossible to explode and therefore, considerably safer than most other known explosive compositions now employed in well treatments; and the mixture of reducing and oxidizing agents when contacted by the igniter liquid is converted to a hypergolic mixture without the need for a conventional impact, shock, or spark type igniter.

Having described the invention, what is claimed and desired to be protected by Letters Patent is:

1. The method of treating a formation traversed by a well which comprises injecting down the well and into the formation a composition consisting of (1) a liquid oxidizing agent selected from the class consisting of nitric acid, red fuming nitric acid, white fuming nitric acid, mixtures of concentrated sulfuric acid and a nitric acid, mixtures of concentrated sulfuric acid and a fuming nitric acid, liquid halogens, hydrogen peroxide, and perchloric acid and (2) a liquid fuel selected from the class consisting of lower carbon chain length hydrocarbons, nitroalkanes, aliphatic alcohol, ethers, and esters, aryl and alkaryl esters, and combustible organic liquid dispersions of finely divided solid fuels selected from the class consisting of bitumen, tars, asphalt, and particulate carbon, and thereafter detonating the composition thus injected by contacting it with a liquid chemical igniter capable of rendering the liquid oxidizing agent and liquid fuel mixture hypergolic.

2. The method of claim 1 wherein the liquid chemical igniter is selected from the class consisting of aniline, alkyl-substituted aniline, furfuryl alcohol, ethylene diamine, butyl amine, diethylene amine, dichloropropene, monochloropropane, and mixtures thereof and solutions of chlorates and perchlorates of sodium and potassium dissolved in nitric acid.

3. The method of claim 2 wherein the liquid detonator is a mixture of furfuryl alcohol and aniline.

4. The method of claim 2 wherein the liquid detonator is a substantially saturated solution of sodium perchlorate in concentrated nitric acid.

References Cited in the file of this patent

UNITED STATES PATENTS

| | | |
|---|---|---|
| 2,316,596 | Kennedy | Apr. 13, 1943 |
| 2,504,119 | Frazer et al. | Apr. 18, 1950 |
| 2,573,471 | Malina et al. | Oct. 30, 1951 |
| 2,637,161 | Tschinkel | May 5, 1953 |
| 2,704,515 | Barlow | Mar. 22, 1955 |
| 2,867,172 | Hradel | Jan. 6, 1959 |
| 2,929,325 | Lewis | Mar. 22, 1960 |